United States Patent [19]

Yagi et al.

[11] Patent Number: 5,081,175

[45] Date of Patent: Jan. 14, 1992

[54] COATING COMPOSITION

[75] Inventors: Toshiharu Yagi; Tsuyoshi Noguchi; Yoshito Tanaka; Kohsaku Sakaguchi; Nobuhiko Tsuda, all of Settsu, Japan

[73] Assignee: Daikin Industries, Ltd., Osaka, Japan

[21] Appl. No.: 635,445

[22] Filed: Dec. 28, 1990

[30] Foreign Application Priority Data

Dec. 29, 1989 [JP] Japan ................. 1-344632

[51] Int. Cl.⁵ ............................. C08K 5/07
[52] U.S. Cl. ..................... 524/357; 428/463; 525/199
[58] Field of Search ......... 524/357; 428/463; 525/199

[56] References Cited

U.S. PATENT DOCUMENTS

| | | | |
|---|---|---|---|
| 2,914,500 | 11/1959 | Barnhart et al. | 524/357 |
| 3,253,060 | 5/1966 | Koblitz et al. | 525/199 |
| 3,454,518 | 7/1969 | Kelly | 525/199 |
| 3,459,834 | 8/1969 | Schmitt | 525/199 |
| 3,779,976 | 12/1973 | Marsico et al. | 525/199 |
| 3,895,029 | 7/1975 | Ward | 525/199 |
| 4,022,742 | 5/1977 | Yoshimura et al. | 524/357 |
| 4,546,149 | 10/1985 | Kidoh et al. | 525/199 |
| 4,557,977 | 10/1985 | Memmer et al. | 525/199 |
| 4,581,412 | 4/1986 | Ohmori et al. | 525/199 |
| 4,861,835 | 8/1989 | Maeda et al. | 525/199 |

FOREIGN PATENT DOCUMENTS 2040293 8/1980 United Kingdom .

Primary Examiner—Veronica P. Hoke
Attorney, Agent, or Firm—Armstrong, Nikaido, Marmelstein, Kubovcik & Murray

[57] ABSTRACT

The present invention provides a coating composition which comprises (a) a polymer containing vinylidene fluoride, (b) an acrylic polymer and (c) acetylacetone, as essential components, and an article which is coated or impregnated with the coating composition.

4 Claims, No Drawings

COATING COMPOSITION

The present invention relates to a coating composition having excellent film property and to an article coated or impregnated with the coating composition.

Although a coating composition containing a vinylidene fluoride polymer is excellent in resistances to weather, heat, chemicals, impact, etc., the composition is inferior in adhesion to a substrate, gloss, transparency, etc. Further, the polymer containing vinylidene fluoride must be treated at a high temperature of at least 200° C. in order to melt and adhere to a substrate, and therefore sometimes colors. Various coating compositions are conventionally investigated to obtain excellent characteristics in gloss, hardness, adhesiveness, transparency, heat resistance, chemical resistance, impact resistance, processability, etc., a coating composition which is excellent in all of the above characteristics is seldom developed.

An object of the invention is to provide a coating composition which is excellent in all of weather resistance, heat resistance, chemical resistance, impact resistance, adhesiveness to a substrate, gloss, transparency, processability, etc., and to provide an article coated or impregnated with the coating composition.

The above and other objects of the invention will become apparent from the following description.

The present invention provides a coating composition which comprises (a) a polymer containing vinylidene fluoride, (b) an acrylic polymer and (c) acetylacetone, as essential components, and an article which is coated or impregnated with the coating composition. The compatibility of a polymer containing vinylidene fluoride and acrylic polymer, which is conventionally deemed difficult, is achieved by the present invention, and the above problem can be solved.

In the present invention, the polymer containing vinylidene fluoride is preierably 500 to a million in number average molecular weight and is obtained by copolymerizing vinylidene fluoride with at least one other copolymerizable monomer. Examples of other monomers are tetrafluoroethylene, chlorotrifluoroethylene, triiluoroethylene, vinyl fluoride, hexafluoropropylene, pentafluoropropylene, hexafluoroisobutene, perfluorocyclobutene, perfluoro(methylcyclopropylene), periluoroallene, $\alpha,\beta,\beta$-trifluorostyrene, perfluorostyrene, polyfluoroalkyl vinyl ethers [e.g., perfluoro(methyl vinyl ether), perfluoro(propyl vinyl ether)], polyfluoroacrylic acid or ester thereof, polyfluorovinyl acetic acid or ester thereof, polyfluorovinyl ether sulionic acid, polyfluorodienes, ethylene, propylene, acrylicacid or ester thereof and vinyl acetic acid or ester thereof. The content of the monomer is not particularly limited but is preferably 10 to 60 wt %.

In the present invention, the acrylic polymer is preferably a homopolymer or copolymer of an acrylic monomer which preferably has a number average molecular weight of 5000 to two millions. Examples of the acrylic monomers are acrylic acid, methacrylic acid, methyl methacrylate (MMA), ethyl methacrylate (EMA), butyl methacrylate (BMA), 2-hydroxyethyl methacrylate (HEMA), 3-(trimethoxysilyl)propyl methacrylate (MSPM), 2-(phenylphosphoryl)ethyl methacrylate (phenyl-P), 2-hydroxy-3-($\beta$-napthoxy)propyl methacrylate (HNPM), N-phenyl-N-(2-hydroxy-3-methacryloxy)propylglycine (NPG-GMA), ethylene glycol dimethacrylate (EDMA or 1G), diethylene glycol dimethacrylate (DiEDMA), triethylene glycol dimethacrylate (Tri-EDMA), 1,4-butanediol dimethacrylate (1,4-BuDMA), 1,3-butanediol dimethacrylate (1,3-BuDMA), 2,2-bis[4-(2-hydroxy-3-methacryloxypropoxy)phenyl]propane (Bis-GMA), 2,2-bis(4-methacryloxyphenyl)propane (BPDMA), 2,2-bis(4-methacryloxyethoxyphenyl)propane (BisMEPP), 2,2-bis(4-methacryloxypolyethoxyphenyl)propane (Bis-MPEPP), di(methacryloxyethyl)trimethylhexamethylenediurethane (UDMA), trimethylolpropanetrimethacrylate (TMPT),

| | |
|---|---|
| $CH_2=C(CH_3)COOCH_2CF_3$ | (3FMA), |
| $CH_2=C(CH_3)COOCH_2CF_2CF_2H$ | (4FMA), |
| $CH_2=C(CH_3)COOCH_2CF_2CF_3$ | (5FMA), |
| $CH_2=C(CH_3)COOCH_2(CF_2)_2CF_3$ | (7FMA), |
| $CH_2=C(CH_3)COOCH_2(CF_2)_3CF_2H$ | (8FMA), | acrylates and $\alpha$-fluoroacrylates corresponding to such compounds. A polymer obtained from at least one of these monomers can be used. Particularly preierable are poly(methyl methacrylate) (PMMA) and a polymer of acrylic monomer containing a fluorine atom.

In the present coating composition, the weight ratio of the polymer containing vinylidene fluoride and the acrylic polymer is generally 99/1 to 1/99, preferably 70/30 to 30/70 in the viewpoint of weather resistance and adhesiveness. Further, the weight ratio of the polymers to be dissolved and acetylacetone is generally 1/100 to 50/100, preferably 5/100 to 30/100 in the viewpoint of coating processability.

The present composition can directly be applied to a substrate and dried at room temperature but the substrate may be coated with a silane coupling agent, etc. as pretreatment. Further, the present composition can be baked after coated in order to improve adhesiveness. It is, further, possible to add, as required, to the present coating composition a known resin, solvent, pigment, filler, dispersing agent, lubricant, abrasive, antistatic agent, etc. in an amount which does not cause adverse effect.

The present coating composition is useful as protective films requiring weather resistance, chemical resistance, etc. for a metal, wood, resin, ceramic, for example, side walls of various vehicles such as an automobile, electric car, airplane and ship, inner or outer covering materials of buildings such as a house, office and factory (roof, side wall, ceiling plate, door, shutter, etc.), furnitures (kitchen goods, air-conditioning units, steel furniture, home electric device, etc.) and outdoor constructions (petroleum tank, etc.). Further, the present coating composition is useful as protective films as impregnated or coated to a ten&, truck hood and like textile or cloth. The present coating composition is not only excellent in weather resistance, etc., but also the printing can be provided on the film thereof, unlike the conventional PTFE-impregnated material. Moreover, the present coating composition is excellent in transparency and adhesiveness, and is useful as films for preventing scattering of inorganic glass or organic glass such as acrylic glass.

In addition, the present coating composition has excellent vibration-proofness and damping property. Accordingly, the present coating composition is useful as vibration-proof damping coating composition !or machines or factory facilities in construction, agriculture or civil engineering, such as a metal-processing machine, duct, hopper, chute, etc.

The invention will be described with reference to the following examples and comparative example, in which the percentages are by weight.

EXAMPLE 1

In 27 g of acetylacetone were dissolved 1.5 g of Daiel® G801 (iodine-containing elastic copolymer containing vinylidene fluoride) and 1.5 g of poly(methyl methacrylate) [PMMA, MW 700000~750000, Tokyo Kasei Kogyo Co., Ltd.] to obtain the Present coating composition having 10 wt % concentration.

The coating composition was applied to an oxalate alumite-treated aluminum plate which was previously coated with a silane coupling agent A-174 [Nippon Unicar Co., Ltd., γ-methacryloxypropyltrimethoxysilane] and heat-treated at 100° C. for 30 minutes, and was heated at 160° C. for 20 minutes to obtain a coated film. The properties of the film were measured and the results were given in Table 1.

The film thickness was measured with use of Permascope EW, a product of Helmut Fischer GmbH.

Pin drawing test was conducted according to JIS K6894.

Pencil hardness was measured by use of a pencil-scratching tester for coating film (JIS K5401).

Cross-cut test was conducted according to JIS D0202.

EXAMPLE 2

A coating composition was prepared in the same manner as in Example 1 except that 1.5 g of a copolymer of vinylidene fluoride and chlorotrifluoroethylene [P(VdF-CTFE), 55 mole % of vinylidene fluoride] was used in place of Dai-el® G801. The coating composition was applied to an aluminum plate treated in the same manner as in Example 1 and heated at 160° C. for 10 minutes and the film properties were shown in Table 1.

TABLE 1

|  | film thickness (μm) | pin drawing test | pencil hardness | cross-cut test |
|---|---|---|---|---|
| Ex. 1 | 30 | 5 | H | 100/100 |
| Ex. 2 | 10 | 5 | F | 100/100 |

In Examples 1 and 2, the coating film was further immersed in hot water of 95% for 5 hours and subjected to cross-cut test with the result of 100/100.

COMPARISON EXAMPLE 1

In 10 g of the below-mentioned solvent was dissolved Dai-el® G801 (1 g) which was the same one as used in Example 1. Thereto was added at 25° C. PMMA (1 g) which was the same one as used in Example 1 to check the solubility. In solvent group A, phase-separation occurred, and in solvent group B, PMMA did not dissolve.

Solvent group A: acetone, methyl ethyl ketone, ethyl acetate, isoamyl acetate, dimethyl acetamide, dimethyl formamide, tetrahydrofuran Solvent group B: diisobutyl ketone, methyl isobutyl ketone, ethyl cellosolve acetate, dimethyl carbitol, N-methyl-2-pyrrolidone, acetonitrile From the above, it is apparent that acetylacetone dissolves efficiently both of a polymer containing vinylidene fluoride and acrylic polymer, compared with other solvents.

We claim:

1. A coating composition which comprises (a) a polymer containing vinylidene fluoride, (b) an acrylic polymer and (c) acetylacetone, as essential components, wherein the weight ratio of the polymer containing vinylidene fluoride and the acrylic polymer is 99/1 to 1/99, and the weight ratio of the polymers to be dissolved and acetylacetone is 1/100 to 50/100.

2. A coating composition as defined in claim 1 wherein the weight ratio of the polymer containing vinylidene fluoride and the acrylic polymer is 70/30 to 30/70.

3. A coating composition as defined in claim 1 wherein the weight ratio of the polymers to be dissolved and acetylacetone is 5/100 to 30/100.

4. An article which is coated or impregnated with the coating compositions of claim 1.

* * * * *